(12) United States Patent
Blessing et al.

(10) Patent No.: US 7,832,537 B2
(45) Date of Patent: Nov. 16, 2010

(54) DUAL CLUTCH ARRANGEMENT

(75) Inventors: Uli Christian Blessing, Heilbronn (DE);
Thomas Deigner, Pfedelbach (DE);
Kuno Fronius, Lauffen (DE); Hansi Gremplini, Freiberg (DE); Guenter Ruehle, Loechgau (DE); Mark Schweiher, Lauffen (DE); Walter Wolf, Marcbach a.N. (DE)

(73) Assignee: GETRAG Getriebe- unk Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 579 days.

(21) Appl. No.: 11/638,788

(22) Filed: Dec. 14, 2006

(65) Prior Publication Data

US 2007/0175723 A1 Aug. 2, 2007

(30) Foreign Application Priority Data

Dec. 21, 2005 (DE) ........................ 10 2005 063 248

(51) Int. Cl.
*F16D 25/0638* (2006.01)

(52) U.S. Cl. .............................. 192/48.91; 192/48.611

(58) Field of Classification Search ............... 74/665 B, 74/665 E, 340; 903/912; 192/87.11
See application file for complete search history.

(56) References Cited

U.S. PATENT DOCUMENTS

2003/0089569 A1* 5/2003 Antonov et al. .......... 192/48.92
2005/0044978 A1* 3/2005 Obinata ..................... 74/421 R
2006/0130601 A1* 6/2006 Hughes ........................ 74/340

FOREIGN PATENT DOCUMENTS

| DE | 101 33 695 A1 | 3/2002 |
|----|----|----|
| DE | 10 2004 062 530 A1 | 10/2005 |
| EP | 1 195 537 B1 | 3/2003 |
| EP | 1 541 401 A1 | 6/2005 |
| FR | 2 799 251 A1 | 4/2001 |
| FR | 2 814 121 A1 | 3/2002 |
| FR | 2 850 906 A1 | 8/2004 |
| WO | WO 2005/065976 | 7/2005 |

OTHER PUBLICATIONS

European Search Report for application EP 06 02 4765, dated Aug. 16, 2010.

* cited by examiner

*Primary Examiner*—Rodney H Bonck
*Assistant Examiner*—Edwin A. Young
(74) *Attorney, Agent, or Firm*—Knobbe, Martens, Olson & Bear, LLP

(57) ABSTRACT

A dual clutch arrangement with an input shaft, with a first friction clutch, and with a second friction clutch. The input element of the first friction clutch is connected to the input shaft and the output element thereof is connected to a first output shaft. The input element of the second friction clutch is connected to the input shaft and the output element thereof is connected to a second output shaft. The output shafts are connectable to corresponding input shafts of a dual clutch transmission. An electric machine is connected to the first output shaft. The electric machine is arranged coaxially with the first friction clutch.

23 Claims, 3 Drawing Sheets

DUAL CLUTCH ARRANGEMENT

BACKGROUND OF THE INVENTION

The present invention relates to a dual clutch arrangement with an input shaft, with a first friction clutch, the input element of which is connected to the input shaft and the output element of which is connected to a first output shaft, with a second friction clutch, the input element of which is connected to the input shaft and the output element of which is connected to a second output shaft, the output shafts being connectable to corresponding input shafts of a dual clutch transmission, and with an electric machine which is connected to the first output shaft.

Such a dual clutch arrangement is disclosed by DE 10 2004 062 530 A1.

Dual clutch arrangements for dual clutch transmissions are commonly known. In a dual clutch transmission the gears are divided between two parallel gear trains, in such a way that the odd gears are assigned to one gear train and the even gears to the other gear train. A separate friction clutch is furthermore assigned to the input side of each gear train. The two friction clutches form a dual clutch arrangement, which is arranged between an engine (usually an internal combustion engine) and the dual clutch transmission.

When a gear is engaged in one gear train and the associated friction clutch is closed, an adjacent gear may already be engaged in the other gear train. On disengagement and opening of the friction clutch for the original gear, the friction clutch for the target gear is closed with a degree of overlap, so that a gear change can take place with no interruption in tractive force.

The basic principle of such dual clutch transmissions has long been known. Just recently this technology has again assumed greater importance.

In the dual clutch transmission disclosed by the aforementioned DE 10 2004 062 530 A1, an electric machine is furthermore connected to the dual clutch transmission. The electric machine is more specifically connected to the first output shaft way of a gearwheel set. The electric machine is supported parallel to the coaxial arrangement of the friction clutches.

EP 1 541 401 A1 discloses a clutch arrangement which can be used for a hybrid drivetrain. The transmission of the drivetrain is a conventional transmission having a plurality of gears, which usually has a single drive-away and disconnect clutch assigned to it, this being arranged between the engine and the transmission.

In the clutch arrangement described therein two friction clutches are not connected to one another in parallel but in series, that is to say by way of an electric machine. In other words, the output element of one friction clutch is connected to the electric machine. The electric machine is furthermore connected to the input element of the other friction clutch.

EP 1 195 537 B1 finally discloses a conventional dual clutch arrangement.

BRIEF SUMMARY OF THE INVENTION

Against this background, the object of the present invention is to specify an improved dual clutch arrangement.

In the dual clutch arrangement specified in the introductory part this object is achieved in that the electric machine is arranged coaxially with the first friction clutch.

The coaxial arrangement of the electric machine allows the electric machine to be optimally integrated into the dual clutch arrangement. The housing of the actual dual clutch transmission can be simplified. Furthermore, it is relatively easy to achieve a modular design of the dual clutch arrangement, so that dual clutch arrangements both with and without an electric machine are both feasible for different product variants.

The object is therefore achieved in full.

In general terms it is to be noted that the first friction clutch may be assigned both to the gear train with the odd gears and to the gear train with the even gears. The differentiation between first and second friction clutch is here made solely in order to better illustrate the invention.

It is particularly advantageous if a rotor of the electric machine is firmly connected to the output element of the first friction clutch.

In this embodiment a full dual clutch arrangement with direct connection to a transmission input shaft is possible without any intermediate torque transmission device.

It is particularly advantageous if the rotor and the output element of the first friction clutch are integrally formed.

In this embodiment the dual clutch arrangement can be constructed using few components.

According to a further preferred embodiment the rotor is fixed radially outside to the output element of the first friction clutch.

In this embodiment a modular dual clutch arrangement is particularly easy to achieve, since the electric machine can be arranged radially outside the friction clutches.

It is furthermore advantageous if the first friction clutch is a multi-plate clutch and if the output element of the first friction clutch is an outer plate carrier.

It is also possible here to integrate an electric machine into a dual clutch transmission drivetrain, without having to make major modifications to the mechanical construction and/or the control.

According to a further preferred embodiment the first friction clutch and the second friction clutch are arranged axial next to one another.

This makes it possible to achieve a radially compact design.

It is particularly advantageous in this case if the first friction clutch is arranged on the output side.

At the same time, with this design it is particularly easy to connect the output element of the first friction clutch to the first output shaft (=transmission input shaft).

Alternatively it is also possible to arrange the first friction clutch on the input side.

All in all this permits a simplification of the overall design construction.

The terms input side and output side are here intended to mean that one friction clutch is arranged closer in an axial direction to the input or output, that is to say they are to be interpreted in purely spatial terms.

According to a further preferred embodiment the first friction clutch and the second friction clutch are arranged nested radially one inside the other.

With this embodiment an axially compact design can be achieved.

It is particularly advantageous here if the first friction clutch is arranged radially outside.

In this way the connection to the electric machine can be accomplished in an especially simple design.

With the radially nested arrangement of the friction clutches it is furthermore preferable for each of the friction clutches to be embodied as a multi-plate clutch and for one plate carrier to form both an inner plate carrier of one friction clutch and an outer plate carrier of the other friction clutch.

This allows the dual clutch arrangement to be designed using few components.

Overall, it is furthermore preferable for the friction clutches to be embodied as wet friction clutches and for a hub, which is fixed to the housing and via which fluid can be delivered to the friction clutches, to be arranged radially inside the friction clutches.

The delivery of fluid can here serve both to actuate the friction clutches and to cool the friction clutches. It is obvious that separate fluid paths are preferably created for this purpose. An especially favourable design for creating these is via such a hub.

The hub is generally arranged radially inside the friction clutches. This does not necessarily mean, however, that the hub has to extend over the entire axial length of the friction clutches. The hub may also extend merely into one of the two friction clutches, or into one section of a friction clutch. The fluid can then be further distributed via suitable housing or cage components of the friction clutches.

It is particularly advantageous if the hub fixed to the housing extends radially from the output side into the friction clutches.

In this embodiment the dual clutch arrangement on the input side is particularly easy to design for connection to an engine.

In an alternative embodiment the hub fixed to the housing is arranged on the input side and extends from the input side into the friction clutches.

In this embodiment it is particularly easy to provide a rotatable conduit for delivering fluid via the hub.

The following general points should be noted. The electric machine may be used as a motor or as a generator, depending on the operating mode. The coaxial construction and the preferred use of components of the friction clutches for connection to the electric machine permit an arrangement that saves overall space. More than one single fixed transmission ratio can be established from the electric machine to the main drive or to the transmission output (depending on the number of gears in the associated gear train). With the connection of the electric machine to the output element of one of the two friction clutches (in the terms used here, the first friction clutch), it is possible to afford all the advantages of hybrid technology including, recuperation, booster operation, automatic engine start/stop, etc.

According to the invention the electric machine can also be integrated into an existing dual clutch transmission system, without having to make major modifications to the mechanical construction or the control. The dual clutch arrangement can be simply designed so as to permit incorporation into a drivetrain with or without an electric machine.

The dual clutch arrangement may be controlled hydraulically, electrically or electromechanically.

It is furthermore obvious that a pump and other ancillary units can be mechanically driven.

It goes without saying that the features specified above and those yet to be explained below can be used not only in the respective combination indicated but also in other combinations or individually without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing.

DETAILED DESCRIPTION OF THE INVENTION

Figure 1:
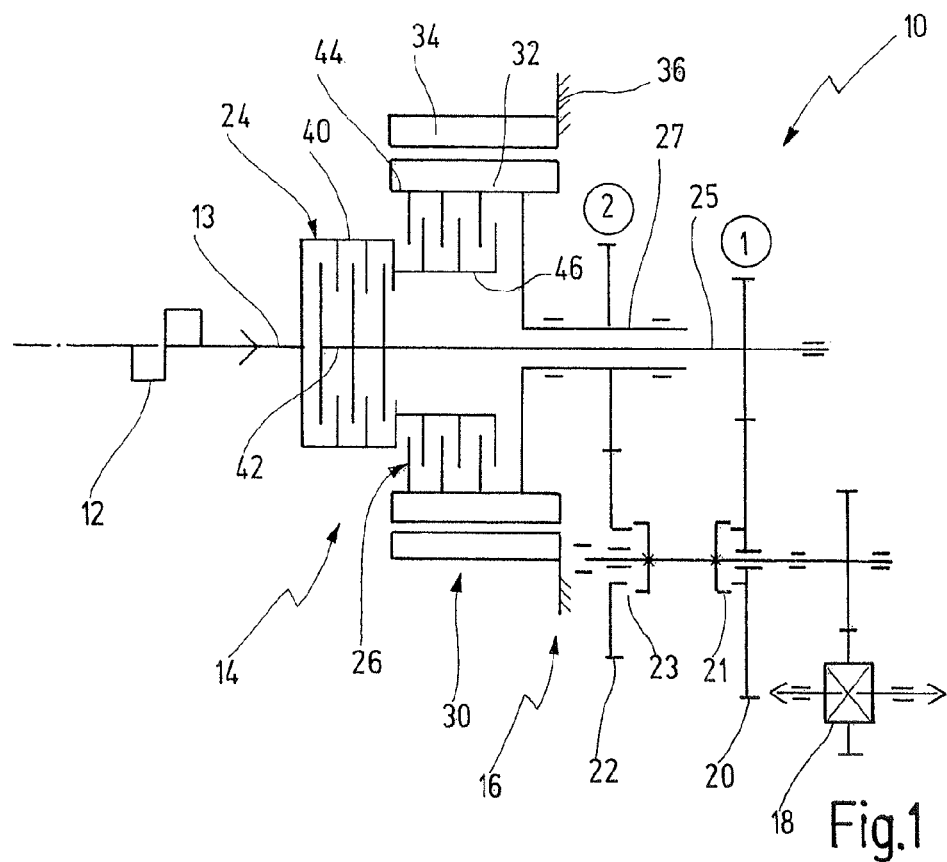
FIG. 1 shows a schematic representation of a drivetrain for a motor vehicle with an embodiment of a dual clutch arrangement according to the invention.

In FIG. 1 a drivetrain for a motor vehicle is generally denoted by 10.

The drivetrain 10 is embodied as a dual clutch transmission drivetrain and comprises an engine 12, generally an internal combustion engine. The drivetrain 10 further comprises a dual clutch arrangement 14, the input of which is connected to an engine output shaft 13.

The drivetrain 10 has a dual clutch transmission 16, which comprises two parallel gear trains. The drivetrain 10 also comprises a differential 18, which is connected to the output of the dual clutch transmission 16 and is designed to distribute drive power to two driven wheels of the motor vehicle.

Although in general usage a dual clutch transmission is understood to mean a combination of two parallel gear trains and one dual clutch arrangement, the term dual clutch transmission is here used in the sense of a transmission having two gear trains for connection to one dual clutch arrangement.

The dual clutch transmission 16 comprises a plurality of gearwheel sets for a corresponding plurality of gears (e.g. 5, 6 or more gears). In this case, for reasons of clarity in presentation, only one gearwheel set 20 for a first gear and one gearwheel set 22 for a second gear are shown. The gearwheel sets 20, 22 are associated with different gear trains. The gearwheel set 20 can be shifted into the power transmission path by means of a first clutch 21. The gearwheel set 22 can be shifted into the power transmission path, or engaged and disengaged, by means of a second clutch 23.

The representation of the dual clutch transmission 16 with a countershaft, which simultaneously forms an output shaft, is to be taken merely as an example.

The dual clutch arrangement according to the invention can be used for any type of dual clutch transmission drivetrain, whether for longitudinal or transverse installation or for front, rear or mid-engine variants.

The dual clutch arrangement 14 has a first friction clutch in the form of a multi-plate clutch 26 and a second clutch in the form of a multi-plate clutch 24.

The second clutch 24 is connected on the input side to the engine output shaft 13. On the output side the second clutch 24 is connected to an output shaft (second output shaft). The second output shaft is connected to a transmission input shaft 25 (internal shaft), which is assigned to the gear train having the odd gears.

On the input side the first friction clutch 26 is likewise connected to the engine output shaft 13. On the output side the first friction clutch 26 is connected (by way of a first output shaft) to another transmission input shaft 27, which is arranged coaxially as a hollow shaft around the other transmission input shaft 25. The other transmission input shaft 27 is assigned to the second gear train of the dual clutch transmission 16, which has the even gears.

An electric machine 30 is arranged coaxially with the dual clutch arrangement 14. A rotor 32 of the electric machine 30 is connected to a first output element of the first friction clutch 26. A stator 34 of the electric machine 30 is fixed to the housing (housing 36).

In this case the electric machine 30 is arranged radially outside the dual clutch arrangement 14. It is also possible, however, to arrange the electric machine 30 coaxially with the transmission input shaft 27, embodied as a hollow shaft, in such a way that the rotor of the electric machine 30 is directly connected to the hollow shaft 27.

The friction clutches 24, 26 are, as stated, embodied as multi-plate clutches. The second friction clutch 24 has an outer plate carrier 40 as input element. An inner plate carrier 42 of the second friction clutch 24 is connected to one transmission input shaft 25 (internal shaft).

An input element of the first friction clutch 26 is embodied as inner plate carrier 46. The inner plate carrier 46 may, on the one hand, be connected directly to the engine output shaft 13. On the other hand, the inner plate carrier 46 may also be connected, as shown, to the outer plate carrier 40 of the second friction clutch 24 (that is indirectly connected to the engine output shaft 13).

An output element of the first friction clutch 26 is embodied as an outer plate carrier 44. The rotor 32 is firmly connected to the outer plate carrier 44 or is preferably even integrally formed with the latter.

The outer plate carrier 44 is connected to the other transmission input shaft 27 (hollow shaft).

Since the electric machine 30 is arranged radially outside the dual clutch arrangement 14, the drivetrain 10 may be designed both with an electric machine and without an electric machine (modular construction).

Integration into existing dual clutch transmission systems is also possible.

Connecting the electric machine to one of the transmission input shafts makes an optimum hybrid operation possible. Different transmission ratios can be set from the electric machine to the transmission output or to the engine (by way of the gears of the gear train that is associated with the first friction clutch 26).

A further advantage of the radially outer arrangement is that with wet friction clutches 24, 26 the electric machine 30 can be incorporated into the cooling circuit of the dual clutch arrangement.

In dual clutch arrangements the cooling fluid is generally fed from radially inside and passes radially outwards due to the centrifugal force. The cooling fluid used in this way can therefore also be used to cool the electric machine situated radially outside, in particular the stator.

The other figures, FIGS. 2 to 5, show different embodiments of the dual clutch arrangement according to the invention.

The general construction and the general working principle of these dual clutch arrangements on the whole correspond to the dual clutch arrangement 14 and its incorporation into the drivetrain 10 in FIG. 1. In the following, therefore, only some design details and modifications will be examined.

Figure 2:
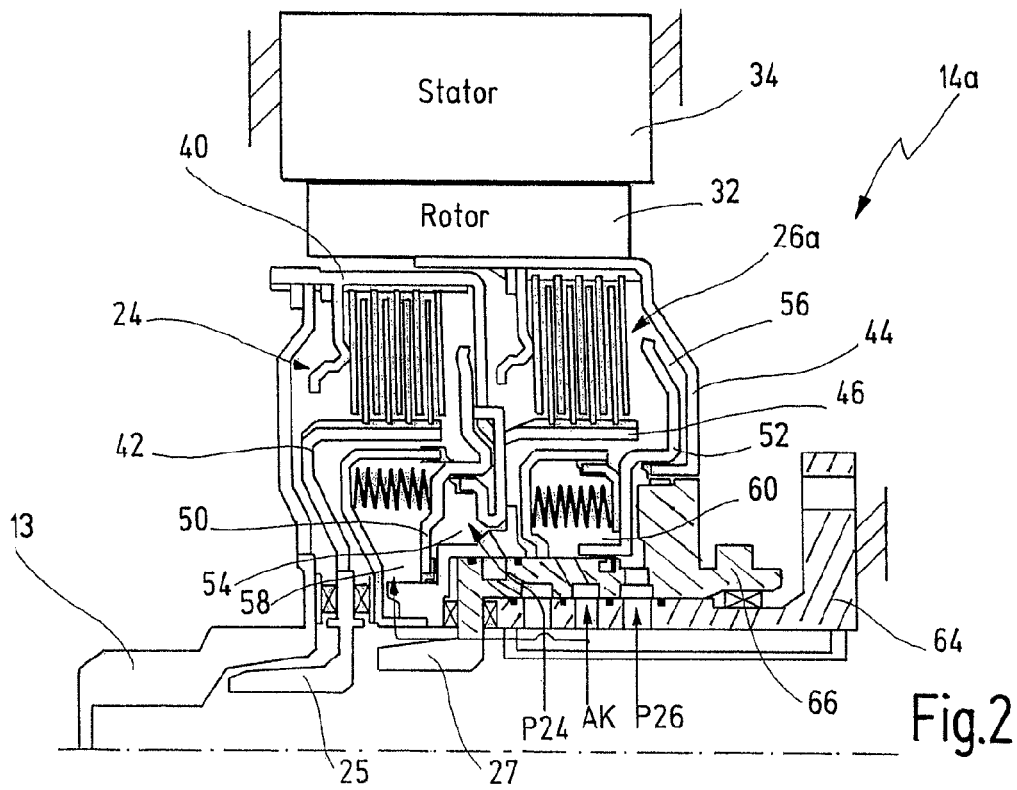
FIG. 2 shows a half sectional view through a further embodiment of a dual clutch arrangement according to the invention.

FIG. 2 shows a dual clutch arrangement 14a, in which the friction clutches 24, 26a are arranged axially in series or side by side.

The second friction clutch 24 is arranged on the input side and the first friction clutch 26a on the output side. The actuator for actuation of the friction clutches 24, 26a is arranged radially inside.

A piston of the second friction clutch 24 is shown at 50. A piston of the first friction clutch 26a is shown at 52. A pressure chamber of the second friction clutch 24 is shown at 54. A hydraulic fluid for actuating the friction clutch 24 can be fed into the pressure chamber 54, as is indicated schematically by an arrow P24. A pressure chamber of the first friction clutch 26a is shown at 56. A hydraulic fluid for actuating the first friction clutch 26a can be fed into this chamber, as is shown by an arrow P26.

A compensating chamber 58, into which hydraulic fluid can be fed in order to be able to compensate for the forces acting on the piston 50, which are generated owing to the centrifugal force acting on the hydraulic fluid in the pressure chamber 54, is furthermore associated with the second friction clutch 24. A corresponding compensating chamber for the first friction clutch 26a is shown at 60.

Springs, not denoted further, for return of the pistons 50, 52 are furthermore arranged in the compensating chambers 58, 60.

A hub 64 fixed to the housing is arranged radially inside the friction clutches 24, 26a. The hub 64 fixed to the housing extends axially from the output side of the dual clutch arrangement 14a into the dual clutch arrangement 14a. By way of the hub 64, hydraulic fluid can be fed via various channels, for delivering hydraulic fluid P24 to the pressure chamber 54, hydraulic fluid P26 to the pressure 56, and for delivering compensating and cooling fluid AK to the compensating chambers 58, 60.

The compensating chamber 58, 60 are designed to supply the friction clutches 24, 26a with cooling fluid by way of openings (not shown) into the clutch components. The cooling fluid can then be fed radially further outwards, that is to say to the electric machine 30 (the stator 34).

The hub 64 here forms a part of a rotatable conduit. The rotating part of the rotatable conduit is formed by a shaft part 66. This is connected on the one hand to the outer plate carrier 44 of the first friction clutch 26a. The shaft part 66 can be connected on the other hand to the other transmission input shaft 27, as is indicated schematically in FIG. 2.

The shaft part 66 furthermore forms another rotatable conduit to the pressure chamber 54. This allows fluid to be fed to the dual clutch arrangement 14a from the output side. In design terms this represents a simple way of connection to the engine output shaft 13.

Figure 3:
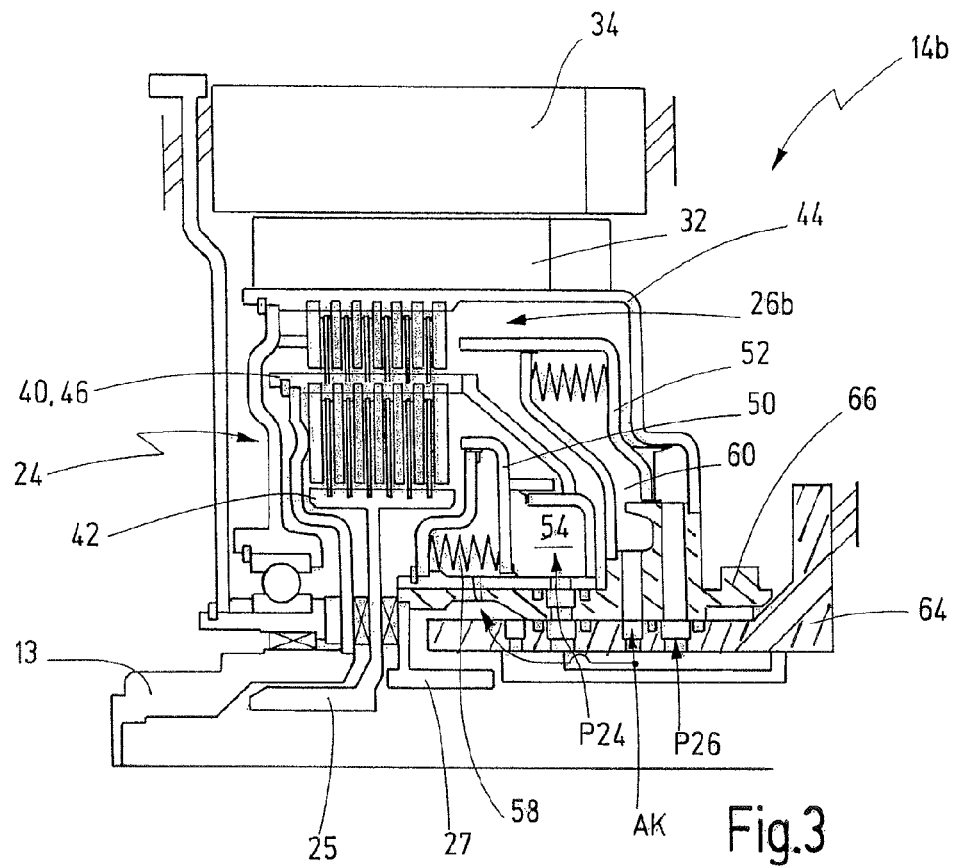
FIG. 3 shows a half sectional view of a further embodiment of a dual clutch arrangement according to the invention.

FIG. 3 shows a further alternative embodiment of a dual clutch arrangement 14b. In its construction and working principle this corresponds generally to the dual clutch arrangement 14a in FIG. 2. Only the differences will be examined below.

The dual clutch arrangement 14b has a first friction clutch 26b and second friction clutch 24, which are arranged nested radially one inside the other. The first friction clutch 26b is arranged radially outside.

A plate carrier 40, 46 serves simultaneously as inner plate carrier 46 for the first friction clutch 26b and as outer plate carrier 40 for the second friction clutch 24. A second rotatable conduit to the pressure chamber 54, via the shaft part 66, is again provided for the second friction clutch 24.

Figure 4:
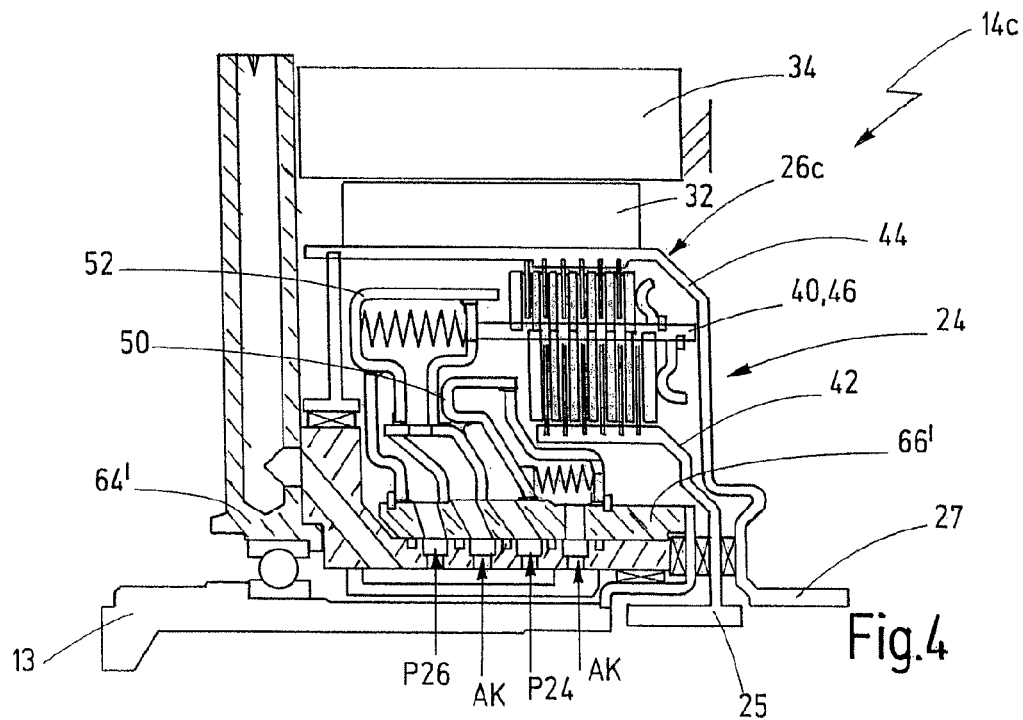
FIG. 4 shows a half sectional view of a further embodiment of a dual clutch arrangement according to the invention.
Figure 5:
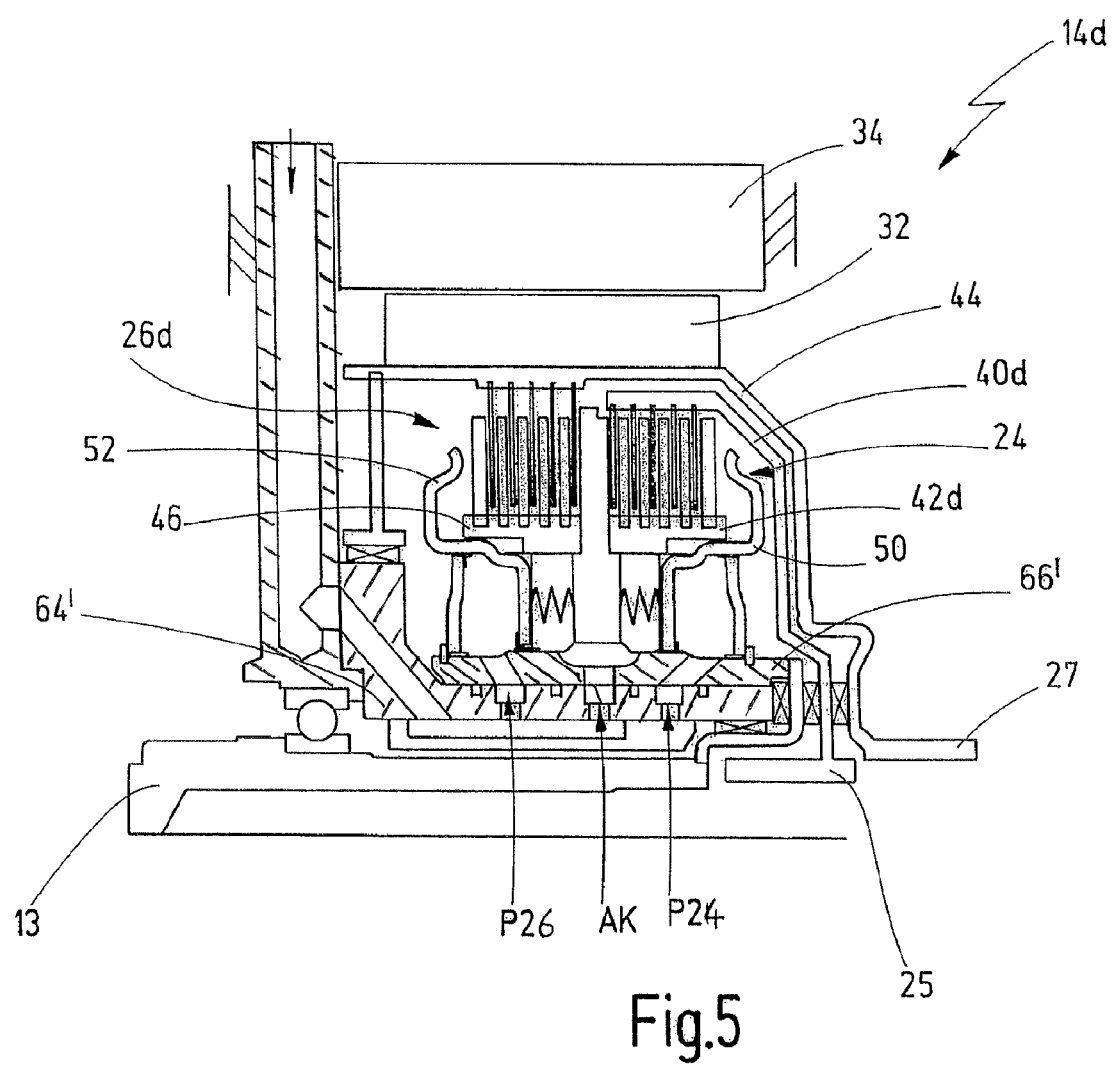
FIG. 5 shows a half sectional view of a further embodiment of a dual clutch arrangement according to the invention.

Two further embodiments of dual clutch arrangements 14c, 14d are shown in FIGS. 4 and 5.

In both cases a hub 64' is provided, which extends axially inwards from the input side of the dual clutch arrangement.

In these embodiments the connection to the input side of the dual clutch arrangement 14c, 14d is somewhat more elaborate. On the other hand the fluid supply can generally be accomplished by one single rotatable conduit.

The dual clutch arrangement 14c shown in FIG. 4 has two friction clutches nested radially one inside the other, the first friction clutch 26c being arranged radially outside.

In the dual clutch arrangement 14d in FIG. 5 the friction clutches are arranged axial next to one another, the first friction clutch 26d being arranged on the input side.

Whereas the shaft part 66 in each of the dual clutch arrangements 14a, 14b is associated with the output side, and is in particular connected to the other transmission input shaft 27, in the dual clutch arrangements 14c, 14d the shaft part 66' is associated with the input. In other words, it is possible for the input elements of the friction clutches 24, 26c and 26d to rotate together with the shaft part 66', so that only one single rotatable conduit is required from the hub 64' to the shaft part 66'.

What is claimed is:

1. A dual clutch arrangement with an input shaft, with a first friction clutch, an input element of which is connected to the input shaft and an output element of which is connected to a first output shaft, with a second friction clutch, an input element of which is connected to the input shaft and an output element of which is connected to a second output shaft, the output shafts being connectable to corresponding input shafts of a dual clutch transmission, and with an electric machine which is connected to the first output shaft, wherein the electric machine is arranged coaxially with the first friction clutch, and wherein the electric machine and the first friction clutch overlap one another in an axial direction.

2. The dual clutch arrangement according to claim 1, wherein a rotor of the electric machine is firmly connected to the output element of the first friction clutch.

3. The dual clutch arrangement according to claim 2, wherein the rotor and the output element of the first friction clutch are integrally formed.

4. The dual clutch arrangement according to claim 2, wherein the rotor is fixed radially outside to the output element of the first friction clutch.

5. The dual clutch arrangement according to claim 1, wherein the first friction clutch is a multi-plate clutch and that the output element of the first friction clutch is an outer plate carrier.

6. The dual clutch arrangement according to claim 1, wherein the first friction clutch and the second friction clutch are arranged axial next to one another.

7. The dual clutch arrangement according to claim 6, wherein the first friction clutch is arranged on an output side of the second friction clutch.

8. The dual clutch arrangement according to claim 6, wherein the first friction clutch is arranged on an input side of the second friction clutch.

9. The dual clutch arrangement according to claim 1, wherein the first friction clutch and the second friction clutch are arranged nested radially one inside the other.

10. The dual clutch arrangement according to claim 9, wherein the first friction clutch is arranged radially outside of the second friction clutch.

11. The dual clutch arrangement according to claim 9, wherein the first friction clutch and the second friction clutch are each embodied as a multi-plate clutch, and wherein a plate carrier forms an inner plate carrier of one friction clutch and an outer plate carrier of the other friction clutch.

12. The dual clutch arrangement according to claim 1, wherein the friction clutches are embodied as wet friction clutches and wherein a hub, which is fixed to a housing and via which fluid can be fed to the friction clutches, is arranged radially inside the friction clutches.

13. The dual clutch arrangement according to claim 12, wherein the hub fixed to the housing extends from an output side of the dual clutch arrangement into the friction clutches.

14. The dual clutch arrangement according to claim 12, wherein the hub fixed to the housing extends from an input side of the dual clutch arrangement into the friction clutches.

15. A dual clutch arrangement with an input shaft, with a first friction clutch, an input element of which is connected to the input shaft and an output element of which is connected to a first output shaft, with a second friction clutch, an input element of which is connected to the input shaft and an output element of which is connected to a second output shaft, the output shafts being connectable to corresponding input shafts of a dual clutch transmission, and with an electric machine which is connected to the first output shaft, wherein the electric machine is arranged coaxially with the first friction clutch, wherein a rotor of the electric machine is firmly connected to the output element of the first friction clutch, wherein the first friction clutch comprises an outer plate carrier,
wherein the rotor and the output element of the first friction clutch are integrally formed, and wherein the rotor is fixed radially outside to the outer plate carrier of the first friction clutch.

16. The dual clutch arrangement according to claim 15, wherein the first friction clutch is a multi-plate clutch and that the output element of the first friction clutch is an outer plate carrier.

17. The dual clutch arrangement according to claim 15, wherein the first friction clutch and the second friction clutch are arranged axial next to one another.

18. The dual clutch arrangement according to claim 15, wherein the first friction clutch and the second friction clutch are arranged nested radially one inside the other.

19. The dual clutch arrangement according to claim 18, wherein the first friction clutch is arranged radially outside of the second friction clutch.

20. The dual clutch arrangement according to claim 18, wherein the first friction clutch and the second friction clutch are each embodied as a multi-plate clutch, and wherein a plate carrier forms an inner plate carrier of one friction clutch and an outer plate carrier of the other friction clutch.

21. The dual clutch arrangement according to claim 15, wherein the friction clutches are embodied as wet friction clutches and wherein a hub, which is fixed to a housing and via which fluid can be fed to the friction clutches, is arranged radially inside the friction clutches.

22. The dual clutch arrangement according to claim 21, wherein the hub fixed to the housing extends from an output side of the dual clutch arrangement into the friction clutches.

23. The dual clutch arrangement according to claim 21, wherein the hub fixed to the housing extends from an input side of the dual clutch arrangement into the friction clutches.

* * * * *